United States Patent
Lusk

[15] 3,657,891

[45] Apr. 25, 1972

[54] HYDRAZINE DECOMPOSITION PROCESS USING MOLYBDENUM-COBALT CATALYST

[72] Inventor: Walter D. Lusk, Hawthorne, Calif.
[73] Assignee: TRW Inc., Redondo Beach, Calif.
[22] Filed: Feb. 3, 1969
[21] Appl. No.: 796,188

Related U.S. Application Data

[62] Division of Ser. No. 611,174, Jan. 23, 1967, abandoned.

[52] U.S. Cl..................................................60/219, 149/36
[51] Int. Cl. ...........................................................C06d 5/04
[58] Field of Search......................................60/219; 149/36

[56] References Cited

UNITED STATES PATENTS

| | | | |
|---|---|---|---|
| 2,758,957 | 8/1956 | Nozaki | 252/470 X |
| 3,503,212 | 3/1970 | Jennings et al. | 60/219 |

*Primary Examiner*—Leland A. Sebastian
*Attorney*—Daniel T. Anderson, Gerald Singer and Alfons Valukonis

[57] ABSTRACT

This invention relates to a process for the spontaneous catalytic decomposition of rocket propellants containing hydrazine or mixtures of hydrazine and hydrazine nitrate. The catalyst used in this invention retains its activity after exposure to the propellant flame environment thereby permitting multiple starts of a rocket engine. The catalyst consists of molybdenum metal and cobalt metal coated on a high surface area support body such as alumina.

8 Claims, No Drawings

HYDRAZINE DECOMPOSITION PROCESS USING MOLYBDENUM-COBALT CATALYST

This is a division of application, Ser. No. 611,174, filed Jan. 23, 1967, now abandoned. This invention discloses a hydrazine decomposition catalyst belonging to the family of hydrazine decomposition catalysts disclosed is co-pending application, Ser. No. 602,115, filed Dec. 16, 1966.

Problems with prior-art hydrazine decomposition catalysts have frequently come from the fact that the catalytic materials are decomposed or reacted at the flame temperature of the propellant. Several catalysts containing cobalt, copper, and alkali metals are known to decompose hydrazine at ambient temperatures, however they are deactivated by flame temperature and thus are suitable for only one start. The transition group metal salts and silver salts also suffer the undesirable property of decomposing at hydrazine flame temperatures. These problems with catalysts did not arise until rocket engine art was extended to include more than one start.

Hydrazine spontaneous decomposition catalysts, according to this invention, are produced by coating molybdenum and cobalt on a high surface area support, such as alumina, thoria, or zirconia. These metals are applied by sequentially soaking the support in solutions of soluble salts of the metals and subsequently reducing the salts to the metals.

Proportions of the catalytic ingredients are effective over a wide range. Molybdenum may be employed in a range from 1-60 weight percent of the support particle, however, 5-35 weight percent is generally preferred. The co-catalyst cobalt may be employed in amounts up to 50 weight percent of the support particle, however, it should be present in minor amounts with respect to the molybdenum and should never exceed the weight percent of the molybdenum present.

Preferably, preparation of the molybdenum-cobalt catalyst is accomplished by soaking the support body in a saturated solution of ammonium molybdate for at least one hour and decanting the excess molybdate solution. These support pellets are then removed and dried in vacuum at approximately 100° C. Upon completion of the drying step, the molybdenum is reduced in a slow moving stream of dry hydrogen at approximately 700° C. Support bodies which have been coated with the molybdenum catalyst are immersed then in a dilute aqueous solution of a soluble salt of the cobalt metal. The excess solution is decanted off and the catalyst impregnated pellets are dried and reduced in a manner similar to the molybdenum.

The decomposition catalyst described above may be employed for hydrazine, alone, or any hydrazine-containing fuel mixture, such as hydrazine-hydrazine nitrate. Details of catalyst position known in the art may be applied here, i.e., no special considerations are necessary as a result of use of the instant catalyst. Generally, all that is required is that the catalyst come in contact with the hydrazine fuel prior to or during ignition of the fuel as the following example shows.

EXAMPLE

A catalyst of the type which is the subject of this invention was used to ignite and decompose a hydrazine-hydrazine nitrate mixture in 3-pound thrust engine hardware. The catalyst was prepared by the method cited above and contained 15% molybdenum and 6% cobalt on a high surface area support of Harshaw 1404 Alumina. The fuel used was a monopropellant containing 75% hydrazine and 25% nitrate. It was found that when the fuel was injected into the catalyst bed, smooth, rapid ignition occurred when the catalyst bed was initially at ambient temperature or near the hydrazine flame temperature. The test engine was operated in a pulsed mode of 100 milli-second firings each second and gave reproducible ignition and smooth decomposition of the fuel. In addition, the engine was operated at steady state for more than ten seconds and the catalyst continued to provide smooth decomposition of the hydrazine throughout the firing.

The hydrazine decomposition catalyst, according to this invention, is attractive not only because of the relative ease of preparation, but because of the low cost of the materials employed. In addition, the catalyst according to this invention, does not decompose upon exposure to the propellant flame environment. This advantageous property permits multiple reignition of rocket engines, a feat of some difficulty and questionable reliability heretofore.

I claim:

1. A method for the spontaneous decomposition of hydrazine propellant fuels which comprises contacting propellant fuels selected from the class consisting of hydrazine and hydrazine-hydrazine nitrate at ambient temperatures with a catalyst consisting essentially of molybdenum and cobalt coated on a high surface area support.

2. A method according to claim 1 wherein the high surface area support is selected from the group consisting of alumina, thoria, and zirconia.

3. A method according to claim 1 wherein the catalyst comprises 1-60 weight percent molybdenum, a minor amount of cobalt, and the balance inert ingredients.

4. A method according to claim 1 wherein the catalyst comprises 5-35 weight percent molybdenum, a minor amount of cobalt, and the balance inert ingredients.

5. A method for decomposing and igniting a hydrazine fuel in a thrust producing engine which comprises contacting propellant fuels selected from the group consisting of hydrazine and hydrazine-hydrazine nitrate at ambient temperatures with a catalyst in a thrust producing engine, said catalyst consisting essentially of molybdenum and cobalt coated on a high surface area support.

6. A method according to claim 5 wherein the high surface area support is selected from the group consisting of alumina, thoria, and zirconia.

7. A method according to claim 5 wherein the catalyst comprises 1-60 weight percent molybdenum, a minor amount of cobalt and the balance inert ingredients.

8. A method according to claim 5 wherein the catalyst comprises 5-35 weight percent molybdenum, a minor amount of cobalt, and the balance inert ingredients.

* * * * *